US009860250B2

(12) United States Patent
Rose et al.

(10) Patent No.: US 9,860,250 B2
(45) Date of Patent: Jan. 2, 2018

(54) SYSTEMS AND METHODS FOR USE IN INDEXING APPLICATIONS BASED ON SECURITY STANDARDS

(71) Applicant: MASTERCARD INTERNATIONAL INCORPORATED, Purchase, NY (US)

(72) Inventors: Neil Rose, Lake St. Louis, MO (US); Kevin Brown, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 83 days.

(21) Appl. No.: 14/967,878

(22) Filed: Dec. 14, 2015

(65) Prior Publication Data
US 2017/0171205 A1 Jun. 15, 2017

(51) Int. Cl.
*H04L 29/06* (2006.01)

(52) U.S. Cl.
CPC .......... *H04L 63/10* (2013.01); *H04L 63/1433* (2013.01)

(58) Field of Classification Search
CPC ....... H04L 63/08; H04L 63/10; H04L 63/101; H04L 63/1433; G06F 21/577; G06F 21/26; G06F 21/604
USPC ............................................. 726/1–3, 22–30
See application file for complete search history.

(56) References Cited

U.S. PATENT DOCUMENTS

| | | | | |
|---|---|---|---|---|
| 6,584,569 B2* | 6/2003 | Reshef | .................. | G06F 21/554 709/203 |
| 7,237,265 B2* | 6/2007 | Reshef | .................. | G06F 21/554 709/203 |
| 8,136,163 B2* | 3/2012 | Birt | ........................ | G06F 11/008 726/25 |
| 8,141,155 B2* | 3/2012 | Jeschke | ............... | H04L 63/1433 713/161 |
| 8,955,038 B2* | 2/2015 | Nicodemus | ........... | G06F 21/577 717/172 |
| 9,294,498 B1* | 3/2016 | Yampolskiy | ........ | H04L 63/1433 |
| 2005/0283834 A1* | 12/2005 | Hall | ...................... | G06F 21/577 726/24 |

* cited by examiner

*Primary Examiner* — Hosuk Song
(74) *Attorney, Agent, or Firm* — Harness, Dickey & Pierce, P.L.C.

(57) ABSTRACT

Systems and methods are provided for assigning scores to target applications, based on one or more security standards, whereby the scores are indicative of the applications' relative security maturity. One exemplary method generally includes receiving an identification of a target application, the target application associated with access to a payment network and soliciting, by a computing device, a response to at least one inquiry regarding a security aspect of the target application. The at least one inquiry is related to at least one standard for data security. The exemplary method further includes assigning, by the computing device, a score to the target application based on the response, as received from a user and publishing the score as associated with the target application to said user or a different user.

21 Claims, 6 Drawing Sheets

AC-5: ARE USER ACCOUNTS GRANULAR ENOUGH TO ADEQUATELY ENFORCE SEPARATION OF DUTIES?

PLEASE ENTER AN EXPLANATION AND ASSIGN A RISK LEVEL.

○ CRITICAL: EX. DUTIES ARE NOT SEGREGATED ADEQUATELY.
○ HIGH: EX. ONLY COARSE GRAIN AUTHENTICATION IS USED.
○ MEDIUM:
○ LOW:
○ INFORMATIONAL:
○ SATISFACTORY:
○ N/A

PLEASE ENTER A COMMENT ASSOCIATED WITH THE RISK LEVEL ABOVE TO EXPLAIN YOUR CHOICE.

○ COMMENTS:

FIG. 4

IA-2: DOES THE APPLICATION FOLLOW ENTERPRISE STANDARDS FOR ID PROPAGATION?

PLEASE ENTER AN EXPLANATION AND ASSIGN A RISK LEVEL.

○ CRITICAL: EX. IDENTITY NOT PROPAGATED
○ HIGH:
○ MEDIUM:
○ LOW: EX. GENERIC IDS IN USE WITH POLICY EXCEPTION IN PLACE
○ INFORMATIONAL:
○ SATISFACTORY: EX. SAML TOKENS USED, NO IDS IN HEADERS
○ N/A

PLEASE ENTER A COMMENT ASSOCIATED WITH THE RISK LEVEL ABOVE TO EXPLAIN YOUR CHOICE.

○ COMMENTS:

FIG. 6

SYSTEMS AND METHODS FOR USE IN INDEXING APPLICATIONS BASED ON SECURITY STANDARDS

FIELD

The present disclosure generally relates to systems and methods for indexing applications, and more particularly, to assigning scores to such applications, whereby the scores are indicative of maturity of the applications relative to one or more security standards.

BACKGROUND

This section provides background information related to the present disclosure which is not necessarily prior art.

Payment networks are provided for processing transactions to payment accounts. The payment networks may employ different applications, which involve different aspects and/or services of the payment transactions. Apart from the payment networks, applications may also be employed to provide access to the payment networks, or to acquirers and/or issuers associated with the payment networks. Regardless of where the applications are hosted and/or implemented, the applications may permit access to a wide range of data within the payment networks, and the entities associated with the payment networks (e.g., the acquirers, the issuers, etc.), which often includes sensitive and/or confidential information. To ensure the security of the data, the applications generally include one or multiple security measures, as dictated by the payment networks. Applications are then updated intermittently, or regularly, to satisfy and/or conform to the security measures, as also dictated by the payment networks.

DRAWINGS

The drawings described herein are for illustrative purposes only of selected embodiments and not all possible implementations, and are not intended to limit the scope of the present disclosure.

Figure 1:
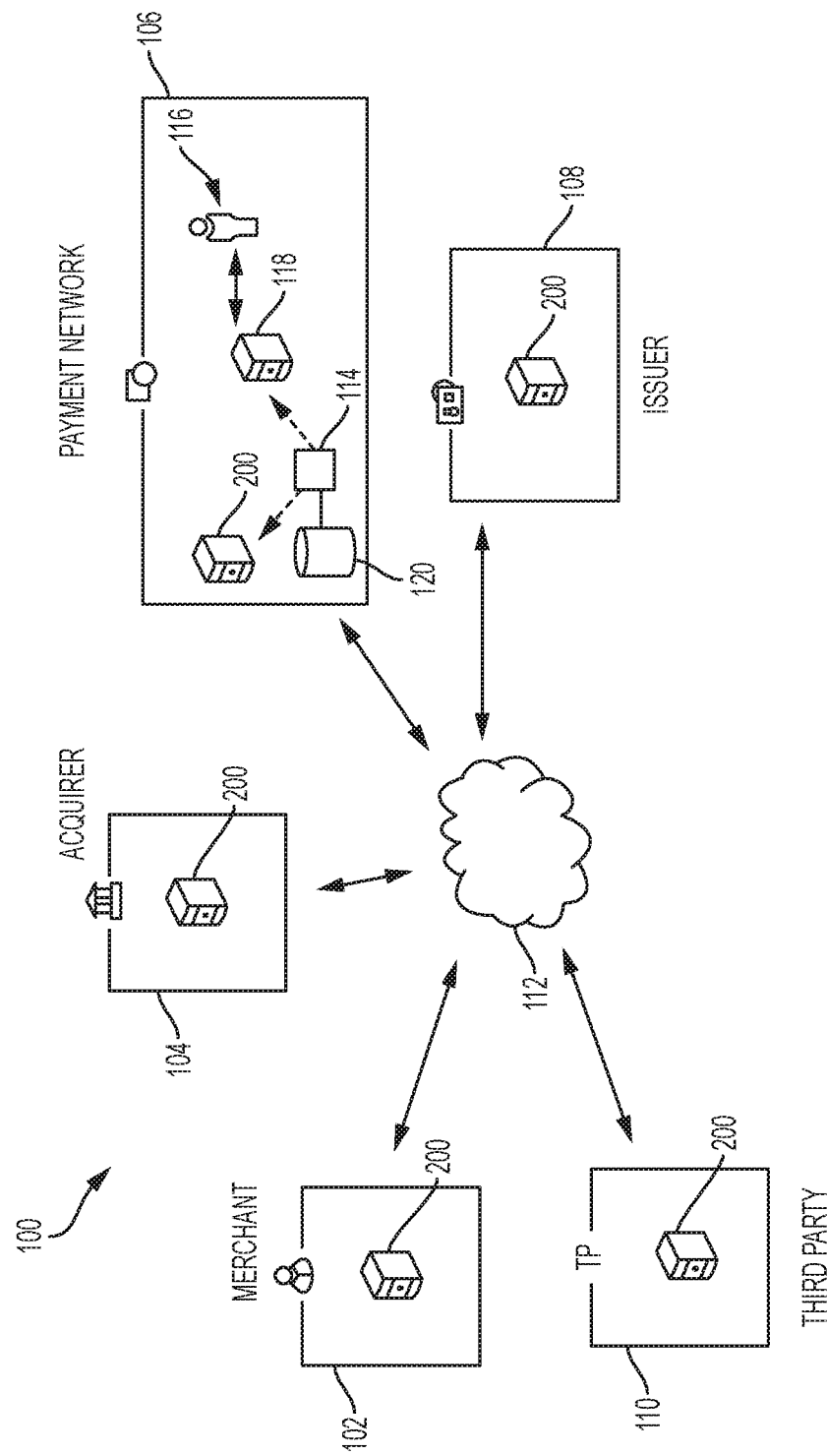
FIG. 1 is a block diagram of an exemplary system of the present disclosure suitable for use in assigning scores to applications based on one or more standards associated with the applications and/or associated with a payment network to which the applications are associated.
Figure 3:
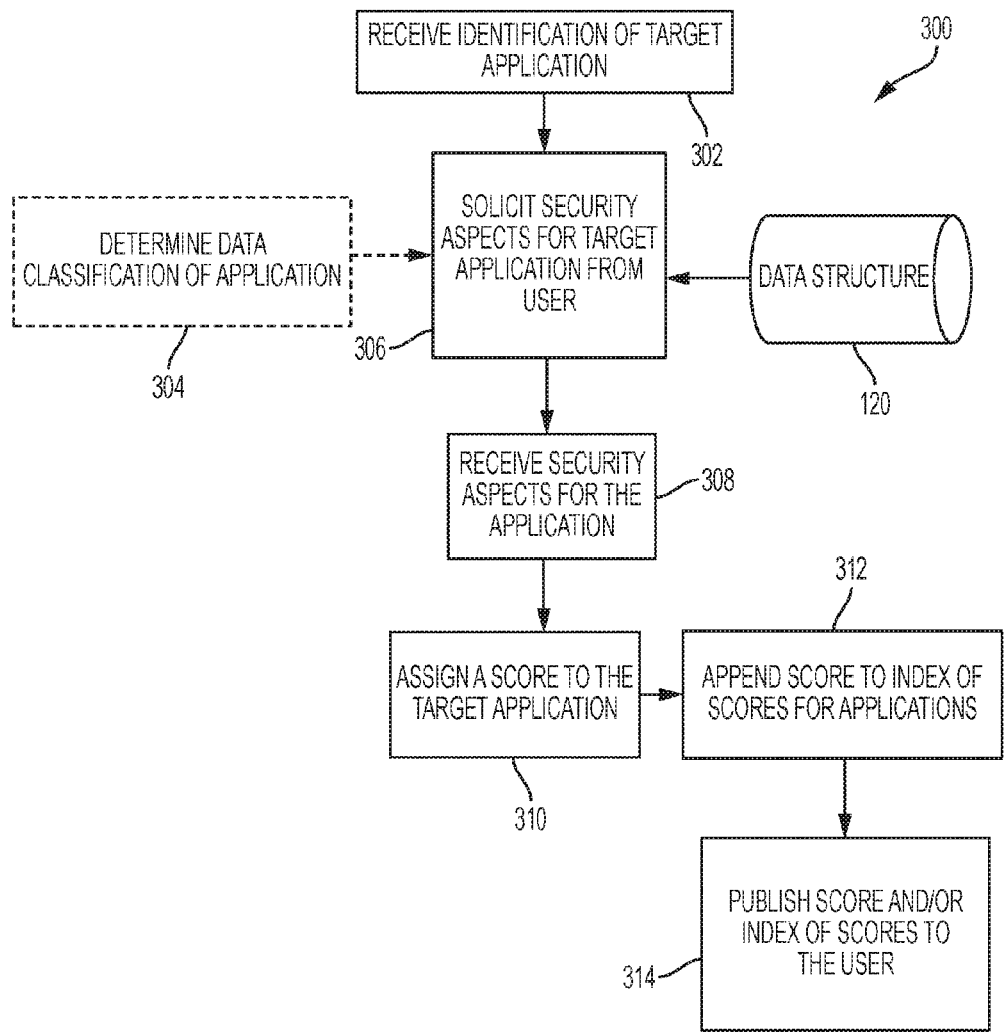
Figure 5:
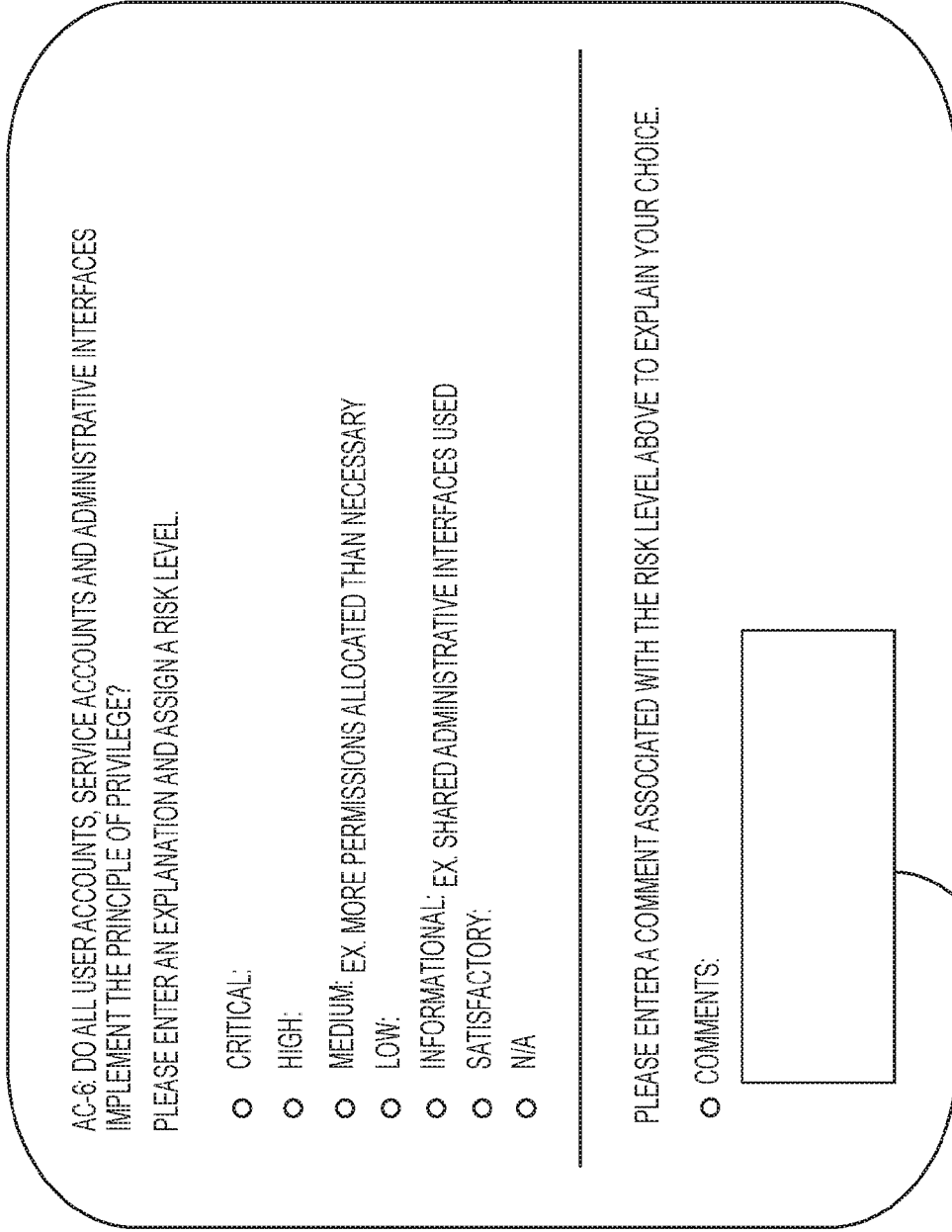

FIG. 3 is an exemplary method for assigning one or multiple scores to a target application, which may be implemented in the system of FIG. 1, based on one or more standards associated with the target application; and FIGS. 4-6 are exemplary interfaces that may be used in connection with the system of FIG. 1 and/or the method of FIG. 3, to solicit scores for one or multiple security aspects for a target application.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Numerous different applications are employed in payment networks, and/or provide access to payment networks and entities associated therewith (e.g., acquirers, issuers, etc.). Because of the applications' access to the payment networks, and data included therein, such applications may present a risk to the payment networks if the applications do not conform to one or more standards of security. Generally, when an application is created and implemented, its security aspects conform to then-existing standards for security, as dictated by the payment networks, for example, or others, per data classifications of the applications (i.e., per the class, or security level, of data which is accessed by the applications). As the applications age, however, and as security standards change or evolve, the applications' security aspects may lag behind the changes, and eventually, fail to comply. The systems and methods herein assign scores to applications, by which the applications may be indexed against one another. The scores are indicative, per application, of the security maturity of the applications for their data classifications and relative to one or more standards. The scores may be assigned as part of regular or intermittent audit cycles for applications, included in and/or accessing the payment networks. The scores and/or index of such scores may be used, by a payment network, to determine which applications present a relatively highest (or most critical) security risk and which applications to then revise and/or update. In this manner, the index may provide a basis for the payment network to allocate resources to particular applications with unsatisfactory scores, thereby providing enhanced security to the payment network, and associated entities, based on vulnerabilities identified by the scores.

While the systems and methods herein are described in connection with applications related to payment networks, it should be appreciated that they are also applicable to other applications (e.g., non-payment account applications, etc.).

FIG. 1 illustrates an exemplary system 100, in which the one or more aspects of the present disclosure may be implemented. Although the system 100 is presented in one arrangement, other embodiments may include systems arranged otherwise, depending on, for example, distribution of applications in the system, access provided by such applications, etc.

The system 100 generally includes a merchant 102, an acquirer 104, a payment network 106, an issuer 108, and a third party 110, each coupled to (and in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the acquirer 104 and the issuer 108 and, separately, a public network, through which the third party 110 may connect to the payment network 106.

Figure 2:
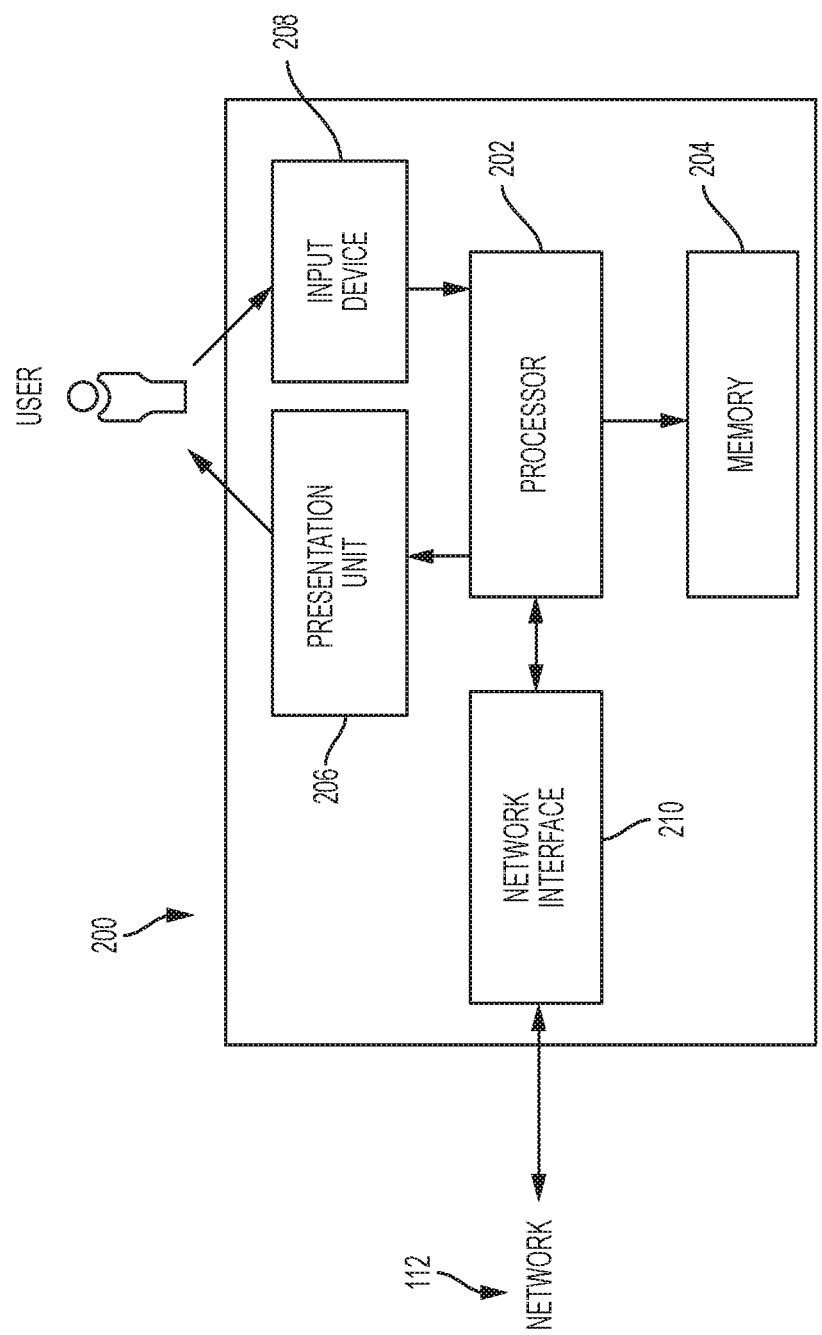
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to operate as described herein. In the exemplary embodiment of FIG. 1, each of the merchant 102, the acquirer 104, the payment network 106, the issuer 108, and the third party 110 are illustrated as including, or being implemented in, computing device 200, coupled to (and in communication with) the network 112. However, the system 100 should not be considered to be limited to the computing device 200, as described below, as different computing devices and/or arrangements of computing devices may be used. In addition, different components and/or arrangements of components may be used in other computing devices. Further, while only a single computing device 200 is associated with these parts, it should be understood that multiple computing devices located in close proximity or distributed over a geographic region may be associated with these parts.

Referring to FIG. 2, the exemplary computing device 200 includes a processor 202 and a memory 204 coupled (and in communication with) to the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, applications, application profiles, security aspects, solicitation interfaces, security standards, data clarifications, scores, indexes, and/or other types of data suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is identifying and/or presenting scores to the user. It should be appreciated that the memory 204 may include a variety of different memories, each implemented in one or more of the functions or processes described herein.

In the exemplary embodiment, the computing device 200 includes a presentation unit 206 that is coupled to (and in communication with) the processor 202 (however, it should be appreciated that the computing device 200 could include output devices other than the presentation unit 206, etc.). The presentation unit 206 outputs information (e.g., scores, score indexes for applications, interfaces soliciting security aspects, etc.), either visually or audibly to a user of the computing device 200, for example, user 116 associated with the payment network 106, etc. It should be further appreciated that various web-based interfaces (e.g., application interfaces, webpages, etc.) may be displayed at computing device 200, and in particular at presentation unit 206, to display information, such as, for example, scores, indexes of scores, security aspect inquiries, etc. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, inputs indicating one or more security aspects of applications, etc. The input device 208 is coupled (and in communication with) to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled (and in communication with) to the processor 202 and the memory 204 for facilitating communication between the computing device 200 and the network 112, for example. The network interface 210 may include, without limitation, a wired network adapter, a wireless network adapter, a mobile network adapter, or other device capable of communicating with one or more different networks, including the network 112. Further, in some exemplary embodiments, the computing device 200 includes the processor 202 and one or more network interfaces incorporated into or with the processor 202.

Referring again to FIG. 1, a consumer (not shown) is associated with a payment account, through which the consumer facilitates transactions for one or more products. In particular, the consumer may initiate a transaction in the system 100 by presenting a payment device, associated with the consumer's payment account, to the merchant 102, for example. The merchant 102, in turn, reads the payment device and/or receives payment account information associated therewith and then communicates an authorization request to the acquirer 104 to determine (in conjunction with the issuer 108) whether the consumer's payment account is in good standing and whether there is sufficient credit/funds to complete the transaction. The acquirer 104, in turn, communicates the authorization request with the issuer 108, through the payment network 106, such as, for example, through MasterCard®, VISA®, Discover®, American Express®, etc. If the issuer 108 accepts the transaction, a reply authorizing the transaction is provided back to the merchant 102, thereby permitting the merchant 102 to complete the transaction. The transaction is later cleared and/or settled by and between the merchant 102 and the acquirer 104 (via an agreement between the merchant 102 and the acquirer 104), and by and between the acquirer 104 and the issuer 108 (via an agreement between the acquirer 104, the payment network 106, and the issuer 108) (and through further communications therebetween). If the issuer 108 declines the transaction, a reply declining the transaction is provided back to the merchant 102, thereby permitting the merchant 102 to stop the transaction.

Transaction data is generated, collected, and stored as part of the above interactions among the merchant 102, the acquirer 104, the payment network 106, the issuer 108, and the consumer. The transaction data represents at least a plurality of transactions, e.g., cleared transactions, attempted transactions, etc. The transaction data, in this exemplary embodiment, is stored at least by the payment network 106 (e.g., in a data structure associated with the payment network 106, etc.).

In various exemplary embodiments, consumers involved in the different transactions herein are prompted to agree to legal terms associated with their payment accounts, for example, during enrollment in their accounts, etc. In so doing, the consumers may voluntarily agree, for example, to allow merchants, issuers of the payment accounts, payment networks, etc. to use data collected during enrollment and/or collected in connection with processing the transactions, subsequently for one or more of the different purposes described herein.

The transaction data may be utilized by a variety of different applications, which are developed and implemented in the system 100, i.e., often in the payment network 106, but also in the merchant 102, acquirer 104, and the issuer 108. The applications may be related, for example, to facilitating purchase transactions, to clearing and/or settling transactions, to bill-pay services, to electronic wallet services (or e-wallet applications, such as, for example, the MasterPass® application, etc.), to application interface programs (APIs), to marketing, to transaction intelligence, and/or to other services, which may rely on accessed transaction data, etc., or to other services unrelated to purchase transactions and related transaction data, but usable and/or related (or not) to one or more parts of the system 100.

It should be appreciated that 10, 50, 100, 500, 1000, or more different applications may be employed in the system 100, and specifically, implemented to provide access to the payment network 106, other parts of the system 100, etc. The applications may be segregated between different parts of the system 100, or even within the parts of the payment network 106 based, for example, on subject matter. For example, certain applications may be accessible to one business unit of the payment network 106 (e.g., bill pay applications, etc.), while different applications may then be accessible to a different business unit of payment network 106 (e.g., customer onboarding, etc.), and so on. The applications, in general, may further be classified according to the types of data accessed and/or available to the applications, i.e., as part of a data classification operation.

In addition, applications related to transaction data may be provided by and/or implemented in the third party 110. The third party 110 is generally any entity, which may access the payment network 106, to affect one or more services related to the merchant 102, the acquirer 104, the payment network 106, the issuer 108, and/or the consumer, etc. For example, the third party 110 may be a rewards provider, which accesses transaction data, stored within the payment network 106, or at issuer 108, to provide, determine and/or manage rewards per consumer, based on transactions to one or more payment accounts.

The third party 110, in this exemplary embodiment, is illustrated as a separate part of the system 100, but may be linked to any of the parts of system 100, for example, via an application program interface (API) (broadly, an application). For example, the third party may have a website that, in some embodiments, incorporates access to the payment network 106, or the issuer 108, for example, via the API, or vice-versa. It should be appreciated that the third party 110 may be associated with any different services pertaining to the payment network 106, whereby the applications accessing the payment network 106, even if the services are provided by the payment network 106, may be used by, or hosted by, the third party 110. In addition, while one third party 110 is shown in the system 100, it should be appreciated that multiple third parties may be included with each operable, for example, to affect one or more services related to the merchant 102, the acquirer 104, the payment network 106, the issuer 108, and/or the consumer, etc.

Referring still to FIG. 1, the payment network 106 includes a security engine 114, which is specifically configured to perform one or more of the operations described herein. In the payment network 106, for example, the user 116 (e.g., a security analyst, developer or auditor, etc.) associated with the payment network 106 (e.g., as an employee, contractor, etc.), performs reviews and/or audits of applications (e.g., target applications, etc.) associated with the payment network 106, via the security engine 114. As shown, the user 116 is associated with a workstation computing device 118, which is consistent with computing device 200.

The security engine 114 may be deployed at multiple locations in the payment network 106 and/or at a centralized location (as indicated by the dotted lines between engine 114 and the computing device 200, and between the engine 114 and the workstation computing device 118). For example, the security engine 114 may be hosted at the computing device 200, and accessed by the user 116, or other users, via the workstation computing device 118 (or via another computing device), or the security engine 114 may be deployed at the workstation computing device 118 (or another individual workstation computing device), for use by the user 116.

Regardless of the location of the security engine 114, a data structure 120 is accessible to the engine 114 for use in scoring target applications. Like the engine 114, the data structure 120 may be at multiple locations in the payment network 106 and/or at a centralized location. For example, the data structure 120 may be incorporated into the computing device 200 of the payment network 106 (for access by multiple workstation computing devices including workstation computing device 118), or may be incorporated in the workstation computing device 118 (with the engine 114, for example). In general, the data structure 120 is stored in memory, such as, for example, memory 204.

The data structure 120 includes one or multiple different standards, upon which the security of the applications may be scored. The data structure 120, for example, includes standards outlined by the payment network 106 (i.e., payment network policies) and/or one or more third party standards. Third party standards may include, without limitation, industry standards, such as, for example, PCI-DSS (data security standards), Control Objectives for Information and Related Technology (COBIT), and/or International Organization for Standardization (ISO), and further governmental standards, such as, for example, the National Institute of Standards and Technology (NIST) 800-53 (i.e., security and privacy controls), in whole or in part. Standards may include requirements and/or best practice guidelines relating to security for the applications. Standards, from the above, for example, may require an application to not include defaults for keys, encryption, passwords, etc., and/or to not include unnecessary or unusable features, to not retain or store accessed transaction data or other data, and/or to auto-fill access credentials, etc. Further standards may be related to, for example, encryption types, communication types, access restrictions, timeout and/or lockout features, PAN masking, anti-virus mechanisms, etc. The above are merely a few examples of the numerous standards that may be included in the data structure 120. Thus, it should be understood that a variety of different standards may be included in the data structure 120, for use by the security engine 114, as described below.

Further, rather than including the above standards, the data structure 120 may include one or more references to one or more standards, stored in one or more other locations, requirements and/or metrics within the PCI, IOS, and COBIT standards, which are relevant to the particular security aspect.

TABLE 1

| ID | Keywords | Control Text | Payment Network Policy | PCI | ISO 17799 | COBIT 4.1 |
|---|---|---|---|---|---|---|
| AC-5 | Separation of duties; Segregation of duties; Collusion; different roles; Audits; Access controls; | The organization: a. Separates [Assignment: organization-defined duties of individuals]; b. Documents separation of duties of individuals; and c. Defines information system access authorizations to support separation of duties. | Admin of User Access to LMA3.0 Data Lifecycle 5.0 | 7.1.2 | 10.1.3, 10.6.1, 10.10.1 | PO4.11 |
| AC-6 | Least privilege; | The organization employs the principle of least privilege, allowing only authorized accesses for users (or processes acting on behalf of users) which are necessary to accomplish assigned tasks in accordance with organizational missions and business functions. | Account Password Mgmt 4.1 Admin of User Access to LMA2.0 Network Sec 5.0 Web App 3.2 | 7.1.1 | 11.2.2 | PO4.11 |
| IA-2 | Identification and authentication; identity propagation; unique identifier; Two-factor/Multifactor/multi-factor; | The information system uniquely identifies and authenticates organizational users (or processes acting on behalf of organizational users). | Account Password Mgmt 4.0 Web App 3.1 | 8.1 8.2 | 11.2.3, 11.4.2, 11.5.2 | AI2.4, DS5.3 | apart from data structure 120, or even apart from payment network 106. For example, the data structure 120 may include a reference to a standard stored and/or disseminated by a proponent of the standard, etc.

In addition, the data structure 120 includes at least one score index data structure (e.g., for an application, or for multiple applications, etc.), which is constructed based on the one or more standards. In general, the score index data structure is separated into different security aspects for an application. Each aspect is assigned an identifier, one or more keywords, and a control text or narrative. The control text (or narrative) is associated with the corresponding industry or government standard being applied and, in general, is the definition of what the particular standard (or security control) means or encompasses. The index score data structure further includes a reference to the applicable standard(s) for the security aspect, which may further include one or more payment network policy.

Table 1 illustrates an exemplary section of an index score data structure for three different aspects of a target application, usable as described herein. As presented, the index score data structure includes a payment network policy reference, and further includes reference to particular In Table 1, for example, the AC-5 aspect (or "Segregation of Duties" control) includes an ID (i.e., AC-5), a listing of keywords representative of the aspect, and a control text that elaborates how the aspect is to be interpreted and/or defined. In this example, the control text is a direct reference to the aspect taken from NIST 800-53r4. And, the ID is the control ID matching the control text from NIST 800-53r4. A similar description applies to the AC-6 and IA-2 aspects in the table. With that said, it should be appreciated (as would be understood by a user of normal security industry experience) that the AC-5 and AC-6 security aspects are provided herein as examples of "Access Controls," with the "Segregation of Duties" control being one aspect thereof. The correlation between the two, then, is that the Access Controls prevent one user from performing multiple duties, and the Segregation of Duties control ensures more than one user is required to complete a sensitive task.

While in Table 1, three security aspects are presented in the index score data structure for purposes of illustration, it should be appreciated that additional security aspects of target applications may be included in other data structures, upon which scores, as described herein, may be assigned, etc.

The data structure 120 in system 100 further includes an interface library, which includes multiple interfaces, one for each of multiple security aspects of target applications. The interfaces, as described below, each include at least one inquiry to a user (e.g., user 116) relevant to a security aspect of an application and intended to solicit a response from the user sufficient to score the security aspect of the application. In general, the interfaces are compiled, by the user, based on the index score data structure described above.

In this exemplary embodiment, the security engine 114 is configured to identify a target application in response to a user input, and to provide inquiries associated with one or more security aspects of the target application to the user 116. To do so, the engine 114 is configured to retrieve, or cause, one or more of the interfaces from the data structure 120, and then cause the same to be displayed, in series, to the user 116. Based on the user's responses to the inquiries at the interfaces, the engine 114 assigns a score to each aspect of the target application and/or to the overall security maturity of the application. In numerous examples, the security engine 114 is configured to then publish the score(s) for the application, alone, or in combination with one or more other scores for multiple other applications, thereby forming an index of scores for the multiple applications. Generating the score(s) will be described in more detail next with reference to method 300.

FIG. 3 illustrates an exemplary method 300 for assigning a score to a target application, based on one or more standards associated with the application. The exemplary method 300 is described as implemented in the security engine 114 of the system 100. However, the method 300 is not limited to the engine 114, or to the system 100, and, as such, may be implemented in other parts of the payment network 106, or more generally, in other parts of system 100 or in other systems. Further, for purposes of illustration, the exemplary method 300 is described herein with reference to the computing device 200. However, the methods herein should not be understood to be limited to the exemplary system 100 or the exemplary computing device 200, and likewise, the systems and the computing devices herein should not be understood to be limited to the exemplary method 300.

At regular intervals, or irregular intervals, or intermittently, an application (e.g., a target application, etc.) is subject to audit or review (in order to remain in the payment network 106, or to be permitted to access the payment network 106), i.e., broadly, is subject to an audit cycle. As part of the audit cycle, the user 116, for example, may employ a variety of different techniques to evaluate the application. In order to determine the security maturity of the application, as part of the audit cycle, the user 116 employs the security engine 114. Initially, the application is identified to the engine 114. In one example, the target application may be identified by selection of the application from a listing of applications. In another example, the user 116 may be prompted, by an interface, to enter the name of the target application to be evaluated. More generally, the identification may be provided automatically, as a schedule for audits indicates, or, the application may be identified manually, from the user 116, or some combination thereof. In addition, the security engine 114 may prompt the user 116 to enter his/her name and/or credentials, or the name of another user responsible and/or tasked with the audit and/or security review of the application.

In response in the method 300, the security engine 114 receives the identification of the target application, at 302, whether from the user, or automatically.

In addition, the security engine 114 optionally (as indicated by the dotted lines in FIG. 3) determines the data classification of the target application, at 304. In particular, as noted above, different applications access different types of data, whether transaction data included in the payment network 106, or other types of data. For example, a payment application (e.g., an e-wallet application, etc.) may access payment account information, and further cause payment transactions to be made, such that the application accesses confidential data. Conversely, a marketing application, which customizes a marketing brochure and/or website, for example, in response to one or multiple user inputs, may only access public data (or data that is not necessarily confidential). As such, the former application may have a relatively high rated security data classification, while the later has a relatively low rated security data classification. The engine 114 may determine the data classification of the target application by reference to an application profile, or by reference to other stored content about the application and/or data accessed by the application, or the engine 114 may receive an indication of the data classification from the user (e.g., user 116, etc.). In the method 300, the data classification of the target application is generally solicited from and provided by the user 116 (along with other information, for example, used to assist with data stratification).

Next in the method 300, the engine 114 solicits responses from the user 116 for each of multiple security aspects of the target application, at 306. As described above, security aspects of the target application may include, without limitation, access control policies and procedures (e.g., pass protection, etc.), audit procedures, security assessments, configuration management, identification and authentication, physical environmental protections, etc. Often, however, the engine 114 preferably solicits data for substantially all relevant security aspects associated with the application. If one or more relevant security aspects are omitted, the score, as assigned below, by the engine 114, may be inaccurate and/or misleading, etc. Notwithstanding which security aspects are identified as relevant for or by the engine 114, the security aspects are generally common among applications, which are later indexed against one another, as described below. With that said, the security aspects, and thus the particular data solicited from the user 116, are generally the same for each application. However, it is contemplated that different solicitations may be requested from the user 116, by the engine 114, for different applications or where different security aspects are implicated (e.g., as additional questions posed to the user 116 based on replies already received, or as follow-up questions posed to the user 116 based on replies already received, etc.). For example, if the user 116 answers "Not applicable" to a question from the engine 114 relating to security aspect AC-3, there may be no follow up questions. But, if the user 116 answers "Medium" to a question from the engine 114 regarding security aspect AC-4, the engine 114 may then follow up with additional questions regarding security aspects AC-4.1 and AC-4.2, etc.

In various embodiments, the engine 114 solicits the security aspect data/input from the user 116 via one or more interfaces, retrieved from the data structure 120. The interfaces may be segregated by type of data solicited, or otherwise.

FIGS. 4-6 illustrate exemplary interfaces that can be displayed to the user 116, in connection with method 300, to solicit data regarding security aspects of the target application. As shown in FIG. 4, the interface 400 includes an inquiry regarding security aspect AC-5, which solicits a response to whether user accounts are granular enough to adequately enforce separation of duties. Inquiries regarding additional security aspects may be included in the interface 400, or in other similar interfaces, as appropriate for the particular target application being audited. Along with the inquiry, the illustrated interface 400 also includes seven optional user responses for indicating risk level of the target application: critical, high, medium, low, informational, satisfactory, and not applicable (N/A). Through these various options, the user 116 is able to choose which most accurately reflects what he/she feels the AC-5 security aspect looks like for the target application.

The interface 400 of FIG. 4 is also configured to receive comments from the user 116 at section 402 along with the selected risk level option. In addition, in the illustrated interface 400, suggested comments are provided for the "Critical" and "High" options to aid the user 116 in selecting among the optional responses, etc., while comments for the remaining options are blank so that the user 116 can provide comments at his/her discretion. For example, the interface 400 indicates, adjacent to the critical response option that duties are not segregated adequately, whereby the user 116 is guided to select the critical optional response to the extent that fact is true. The user 116 can then provide comments, as appropriate, via the comments section 402, wherein the user 116 is permitted and/or expected to provide a comment explaining the selection of one of the optional responses. It is contemplated that, in other embodiments, interfaces may include more prescriptive risk options/comments, as desired and/or appropriate.

While not shown, it should be understand that the inquiries are based on one or more standards, which the engine 114 identifies to each of the inquiries (e.g., from data structure 120, etc.). The interface 400, for example, may be identified to one or more of the PCI DSS v2 7.1.2, ISO 17799 10.1.3 and 10.6.1, and COBIT 4.1 P04.1 standards. In addition, the inquiries may be identified to one or more other standards, including the payment network's internal standards. This may be used, by the user 116, for example, to reference to particular standards to assist the user 116 in responding to the inquiries.

FIG. 5 illustrates exemplary interface 500, which includes an inquiry regarding security aspect AC-6 soliciting a response as to whether all user accounts, service accounts, and administrative interfaces implement the principle of least privilege. This means that a user will only have security access needed for the user to complete his/her job function(s). For example, a normal application user would not have access to administer the target application. Instead, he/she would need to have a system administrator perform administrative task(s). Alternatively, the system administrator would be able to administer the system, but not have access to use the application functionality. Along with the inquiry, the interface 500 of FIG. 5 also includes seven optional user responses for indicating risk level of the target application: critical, high, medium, low, informational, satisfactory, and not applicable (N/A). Through these various options, the user 116 is able to choose which most accurately reflects what he/she feels the AC-6 security aspect looks like for the target application. The interface 500 further includes a comments section 502, wherein the user 116 is permitted and/or expected to provide a comment explaining the selection of one of the optional responses.

Similarly, FIG. 6 illustrates exemplary interface 600, which includes an inquiry regarding security aspect IA-2 soliciting a response as to whether the target application follows enterprise standards for identity (ID) propagation. As would be understood by a user of normal security industry experience, ID propagation is where a user identity follows the user throughout the target application. For example, when the user first logins to the application, the user enters his/her identity into a home page. If there are three distinct features within the application, the user's identity would propagate to each of those features/functions and the user wouldn't need to login three separate times for each of the application features. If the target application does not have ID propagation, the user will need to login multiple times, or the application is not designed appropriately to verify which user is using each of the sub functions. Along with the inquiry, again, the interface 600 includes seven optional user responses (as described above for interfaces 400 and 500) and a comments section 602, wherein the user 116 is permitted and/or expected to provide a comment explaining the selection of one of the optional responses.

It should be appreciated that any number of different interfaces may be used, by the engine 114, to solicit different security aspects from the user 116, or other users, often at workstation computing devices. The interfaces may be specific to a single security aspect, or may be related to multiple security aspects of the target application.

The inquiries (included in the interfaces used to solicit security aspect data from the user 116) are presented with multiple options, e.g., seven options in the above example interfaces 400, 500, and 600. The inquiries are phrased so that the responses correspond to a particular score, ranging from critical risk to not applicable (or satisfactory), as indicated in Table 2, below. The risks are associated with risk values for the particular security aspect addressed in the particular inquiry, which, in this embodiment, range from 0-5. As such, by the selection of a response by the user, a risk value for the security aspect is identified for the target application.

TABLE 2

| Risk Value | Risk Option |
| --- | --- |
| 5 | Critical Risk |
| 4 | High Risk |
| 3 | Medium Risk |
| 2 | Low Risk |
| 1 | Information Risk |
| 0 | Not Applicable or Satisfactory |

Additionally, or alternatively, in at least one embodiment, the security engine 114 may access an application profile, for the target application, which includes one or more security aspects. Specifically, when an application is developed, an application profile may be compiled, which includes certain data about the application that may be generated and stored in memory, for example, in the memory 204 of the computing device 200 of the payment network 106. In such embodiments, the security engine 114 may access the application profile, for the selected target application, to receive the relevant security aspects for the application and identify a risk value for the security aspect(s).

Further, in some embodiments, the engine 114 may employ a combination of accesses to an application profile, and interfaces to the user, to solicit certain security aspects for the particular target application.

With continued reference to FIG. 3, regardless of the manner in which the security aspects are solicited, the security engine 114 receives the security aspects, at 308.

Then, the engine 114 assigns a score to the security aspects, at 310, and thus the target application. In this particular exemplary embodiment, the security engine 114 employs one or more algorithms to generate the score of the target application. One example algorithm is defined below as Equation (1). As shown, the score is based on the risk value (Rv) of the target application, which is identified on a scale of 0-5 in this exemplary embodiment (see Table 2). The score is further based on a control weight (W) for the security aspects and/or the target application (e.g., based on data classification of the target application, etc.). In one example, the weight is assigned by taking the NIST 800-53 control baseline designated for the particular security aspect. For the AC-10 associated security aspect in NIST, the designation is high and, as such, a weight control of "2" is provided. Conversely, the designation for the security aspect associated with AC-3 (4), for example, is not high, and as a result, a weight control of "1" is provided for that aspect.

$$\text{Score} = 100 \times \frac{Rv \times W}{5T} \quad (1)$$

Finally in this example, using Equation (1) to generate the score for the security aspect of a target application, the engine 114 relies on a total control (T). The total control is the number of security controls/inquiries that are being asked of user 116. For example, if the engine 114 only asks 10 questions to the user 116 regarding the target application, each question asked would be 1/10th of the score. However, if the engine 114 asks 100 questions to the user 116, each question is 1/100th of the score. In some embodiments, certain questions/inquiries may have multipliers applied to them. For example, security aspect AC-2 may have a 2× multiplier (or other configurable multiplier) applied thereto, so that values for each inquiry answer are doubled.

It should be appreciated that a variety of different algorithms and/or operations may be employed to assign a score of a security aspect and/or to otherwise provide an evaluation of a security aspect for a target application based on one or more different standards.

Once a score is generated for/assigned to the security aspect, as described above, the security engine 114 further assigns individual scores to each additional security aspect for the target application. As indicated above, this may include all relevant security aspects, as defined by one or more standards, for the target application, or it may include a subset thereof. The individual scores are then used to create a score (e.g., a total score, etc.) for the target application (e.g., as an average of the individual scores, etc.) for comparison to other applications or to security control categories. In some embodiments, the resulting score (e.g., the resulting total score, etc.) for the target application may simply include the score generated using Equation (1).

Once the overall score is assigned or created, the security engine 114 appends the score to an index of scores for one or more other applications, at 312. In general, the other applications included in the index are also applications that provide access to one or more parts of the payment network 106. The index of scores, or in some embodiments, only one of the scores, is then published by the security engine 114, at 314. To publish the score and/or the index of scores, the security engine 114 may store the score or index of scores in memory 204, accessible to the user 116, or the engine 114 may report the score or index of scores to the user 116 (or another user), or cause the scores and/or index of scores to be displayed to the user 116 (or another user). It should be appreciated that the score (or index of scores) may be published in any manner, by which the user 116 (or other users) are able to view and/or verify the score (or index of scores). In at least one embodiment, the score (or index of scores) is published to one or more data structures, indicating records of the audit in general, and then only published to the user 116, when the score fails to satisfy or exceed one or more thresholds.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving a selection of a target application, the target application defining access to a payment network; (b) receiving at least one security aspect for the target application; (c) accessing at least one standard associated with the payment network; (d) assigning a score to the target application based on the at least one standard and a data classification of the target application; and (e) publishing the score to a user, whereby the score provides an indication of possible vulnerabilities associated with the target application and whether or not resources should be allocated to the target application to provide enhanced security in association therewith.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in assigning a score, indicative of security maturity, to a target application, the method comprising:
   receiving an identification of a target application, the target application associated with access to a payment network;
   soliciting, by a computing device, responses to multiple inquiries regarding security aspects of the target application, each of the multiple inquiries related to a different one of the security aspects, and the security aspects defined by at least one standard for data security;
   generating a score for each of the security aspects of the target application addressed in the multiple inquiries, based on at least some of said responses to the inquiries, and assigning, by the computing device, a total score to the target application based on the score generated for each of the security aspects of the target application; and
   publishing at least the total score as associated with the target application to a user, whereby at least the total score provides an indication of possible vulnerabilities associated with the target application and whether or not resources should be allocated to the target application to provide enhanced security in association therewith.

2. The computer-implemented method of claim 1, wherein soliciting the response to the at least one inquiry includes causing, by the computing device, an interface to be displayed to the user, the interface including the at least one inquiry.

3. The computer-implemented method of claim 1, wherein the assigned total score for the target application includes an average of the scores generated for each of the different security aspects of the target application addressed in the multiple inquiries.

4. The computer-implemented method of claim 1, wherein generating a score for each of the security aspects of the target application includes generating said score based on the equation:

$$\text{Score} = 100 \times \frac{Rv \times W}{5T}$$

where Rv is a risk value for said security aspect of the target application, W is a control weight for said security aspect of the target application, and T is a total control factor based on a number of the multiple inquiries solicited by the computing device.

5. The computer-implemented method of claim 1, wherein publishing at least the total score includes appending the total score to an index of scores for multiple applications and publishing the index of scores to a data structure and/or the user, whereby the user is able to determine which application presents a relatively highest security risk.

6. The computer-implemented method of claim 1, wherein the at least one standard for data security includes a National Institute of Standards and Technology 800-53 standard.

7. The computer-implemented method of claim 6, wherein the at least one standard for data security includes multiple industry standards.

8. A non-transitory computer readable storage media including executable instructions for scoring target applications for security maturity, which when executed by at least one processor, cause the at least one processor to:
   receive, from a user, an identification of a target application, the target application associated with access to a payment network;
   cause multiple interfaces to be displayed to the user, each of the multiple interfaces including at least one inquiry regarding a security aspect of the target application, the at least one inquiry related to at least one standard for data security; and
   assign a score to the target application based on responses received from the user, via the multiple interfaces, whereby the score is indicative of a maturity of the target application relative to the at least one standard for data security.

9. The non-transitory media of claim 8, wherein the executable instructions, when executed by the at least one processor, further cause the at least one processor to solicit and receive, from the user, a data classification of the target application; and
   wherein at least one of the at least one inquiry in at least one of the multiple interfaces is based on the data classification of the target application.

10. The non-transitory media of claim 9, wherein the multiple interfaces include at least one interface related to segregation of duties control for the target application.

11. The non-transitory media of claim 9, wherein the executable instructions, when executed by the at least one processor, further cause the at least one processor to index the target application, relative to one or more other target applications, based on the assigned score for the target application, and publish the index to at least one data structure coupled to the at least one processor.

12. The non-transitory media of claim 8, wherein the executable instruction, when executed by the at least one processor, cause the at least one processor to assign the score based on the equation:

$$\text{Score} = 100 \times \frac{Rv \times W}{5T}$$

where Rv is a risk value for the security aspect of the target application, W is a control weight for the security aspect of the target application, and T is a total control for the target application.

13. The non-transitory media of claim 11, wherein at least one of the multiple interfaces includes multiple risk levels as response options to the at least one inquiry included in the at least one of the multiple interfaces.

14. The non-transitory media of claim 13, wherein the multiple risk levels include a critical risk, a high risk, a medium risk, and a low risk, which correspond to risk values of 5, 4, 3, and 2, respectively.

15. The non-transitory media of claim 14, wherein at least one of the risk levels included in the response options includes an example description associated therewith, whereby the user is guided to select the said at least one risk level to the extent that the example description is accurate for the security aspect of the target application addressed in the corresponding at least one inquiry.

16. The non-transitory media of claim 8, wherein the at least one standard for data security includes at least one of a National Institute of Standards and Technology 800-53 standard, an International Organization for Standardization (ISO) standard, and a Control Objectives for Information and Related Technology (COBIT) standard.

17. The non-transitory media of claim 12, wherein the control weight (W) is based on the at least one standard for data security and/or a data classification of the target application.

18. A system for use in auditing one or more target applications for payment network access, the system comprising:
at least one computing device comprising a memory and a processor, the memory including multiple interfaces, each of the multiple interfaces including at least one inquiry regarding a security aspect of an application based on at least one standard for data security, the at least one inquiry included in each of the multiple interfaces associated with at least three risk level option responses;
wherein the processor is configured to:
solicit, from a user, an identification of a target application;
receive the identification of the target application and a data classification of the target application;
cause at least some of the multiple interfaces in the memory, associated with the target application, to be displayed to a workstation computing device associated with the user;
receive, from the user, a selection of one of the at least three risk level option responses for each of the at least one inquiry included in the at least some of the multiple interfaces caused to be displayed to the workstation computing device;
generate a score for each security aspect of the target application, based at least in part on said selections of ones of the at least three risk level option responses;
assign a total score to the target application, based on the generated scores; and
index and publish the assigned total score relative to at least one other assigned score for at least one other application, whereby the user is able to determine which application presents a relatively higher security risk.

19. The system of claim 18, wherein the processor is configured to generate the score for each security aspect of the target application based on the equation:

$$\text{Score} = 100 \times \frac{Rv \times W}{5T}$$

where Rv is a risk value for the security aspect of the target application, W is a control weight for said security aspect of the target application, and T is a total control factor based on a number of inquiries included in the at least one inquiry solicited by the computing device.

20. A computer-implemented method for use in assigning a score, indicative of security maturity, to a target application, the method comprising:
receiving an identification of a target application;
soliciting, by a computing device, a response to at least one inquiry regarding a security aspect of the target application, the at least one inquiry related to at least one standard for data security;
assigning, by the computing device, a score to the target application based on the response, as received from a user;
indexing the target application, relative to one or more other applications, based on the assigned score for the target application, and publishing the index to at least one data structure; and
publishing the score as associated with the target application to said user or a different user, whereby the score provides an indication of possible vulnerabilities associated with the target application and whether or not resources should be allocated to the target application to provide enhanced security in association therewith.

21. The computer-implemented method of claim 20, wherein the at least one standard for data security includes at least one of a National Institute of Standards and Technology 800-53 standard, an International Organization for Standardization (ISO) standard, and a Control Objectives for Information and Related Technology (COBIT) standard.

* * * * *